US006950968B1

(12) United States Patent
Parolari et al.

(10) Patent No.: US 6,950,968 B1
(45) Date of Patent: Sep. 27, 2005

(54) SYSTEM AND METHOD FOR CONDUCTING DIAGNOSTICS IN A TELECOMMUNICATIONS NODE

(75) Inventors: Raul Parolari, San Rafael, CA (US); Kala Subbaraman, Rohnert Park, CA (US)

(73) Assignee: Alcatel, Paris (FR)

( * ) Notice: Subject to any disclaimer, the term of this patent is extended or adjusted under 35 U.S.C. 154(b) by 551 days.

(21) Appl. No.: 10/109,993

(22) Filed: Mar. 29, 2002

Related U.S. Application Data

(60) Provisional application No. 60/308,981, filed on Jul. 31, 2001.

(51) Int. Cl.[7] .............................................. G06F 11/00
(52) U.S. Cl. ........................... 714/43; 714/716; 399/23
(58) Field of Search .................... 714/43, 716; 399/23

(56) References Cited

U.S. PATENT DOCUMENTS

| | | | | |
|---|---|---|---|---|
| 4,271,513 A | * | 6/1981 | Maejima et al. ............ | 714/716 |
| 5,128,962 A | * | 7/1992 | Kerslake et al. ............ | 375/220 |
| 5,586,123 A | * | 12/1996 | Baker ........................ | 714/716 |
| 5,802,073 A | * | 9/1998 | Platt ........................... | 714/733 |
| 6,023,774 A | * | 2/2000 | Minagawa ................... | 714/43 |
| 6,038,687 A | * | 3/2000 | Ho ............................. | 714/30 |
| 2001/0052029 A1 | * | 12/2001 | Harbin ....................... | 709/251 |

* cited by examiner

Primary Examiner—Bryce P. Bonzo
(74) Attorney, Agent, or Firm—Danamraj & Youst, PC; Bobby D. Slaton; V. Lawrence Sewell

(57) ABSTRACT

A system and method for conducting diagnostic tests on a network card disposed in a telecommunications node. A diagnostic application automaton is launched at predetermined intervals by a base level diagnostics automata under the control of an executive scheduler running on the network card, wherein the network card is initially in a provisioned configuration mode operable to transmit and receive communication traffic therethrough. Upon determining by the base level diagnostics automata to install the diagnostic application, the network card is reconfigured into a loopback configuration mode involving a predefined loopback path in the telecommunications node. Operations relating to the telecommunications traffic are suspended in the loopback mode, whereby one or more diagnostic tests may be performed by the installed diagnostic application by injecting appropriate test patterns at specific locations in the path. Upon completing the diagnostic tests, the network card is reconfigured into the provisioned configuration mode in order to commence the communication traffic.

20 Claims, 9 Drawing Sheets

SYSTEM AND METHOD FOR CONDUCTING DIAGNOSTICS IN A TELECOMMUNICATIONS NODE

PRIORITY UNDER 35 U.S.C. §119(e) & 37 C.F.R. §1.78

This nonprovisional application claims priority based upon the following prior United States provisional patent application entitled: "System And Method For Conducting Diagnostics In A Telecommunications Node," filed Jul. 31, 2001, Ser. No. 60/308,981, in the name(s) of: Raul Parolari and Kala Subbaraman, which is hereby incorporated by reference for all purposes.

BACKGROUND OF THE INVENTION

1. Technical Field of the Invention

The present invention generally relates to telecommunications. More particularly, and not by way of any limitation, the present invention is directed to a system and method for conducting diagnostic tests in a telecommunications node using a network card disposed therein.

2. Description of Related Art

The remote access market is undergoing a major metamorphosis. Three factors serve as catalysts for change. The first is the growing number of users, for example, small office/home office (SOHO) users, demanding high performance Internet and remote access for multimedia. Liberalized governmental activity with respect to telecommunications is another factor, which is fostering broader competition through deregulation in local area markets everywhere. The third and final factor is congestion in the Public Switched Telephone Network (PSTN), originally designed and developed for voice-only traffic.

There have been several important advances in telecommunications technology that enable high rates of throughput in carrier networks' backbone connections. For example, by implementing Asynchronous Transfer Mode (ATM) networking technology over a Synchronous Optical Network (SONET)/Synchronous Digital Hierarchy (SDH) physical layer, carrier networks can achieve data rates of up to several hundred megabits per second (Mbps). However, efforts to meet the bandwidth demand for remote access have been beset by the limitations of the existing twisted-pair copper cable infrastructure (i.e., access network) provided between a carrier's central office (CO) and a subscriber's remote site, typically referred to as the local loop. In the telecommunications art, these limitations are sometimes collectively described as the "last-mile" problem.

Current access network solutions that attempt to avoid the bottleneck created by the last-mile problem involve the use of fiber optic technology in the local loop also. As with the high-speed carrier networks, the fiber-based local loop infrastructure is typically architected using SONET as the physical layer technology. With recent developments in optical components and related opto-electronics, in addition to improvements in network design, broadband access is now becoming commonplace.

Moreover, in order to improve reliability of the access network, the equipment is necessarily deployed with redundancy, wherein critical components of an access node are provided in a duplex configuration. Additional safeguards are also typically provided in order to ensure that the access network operates with the so-called "five-nines" availability (i.e., 99.999% uptime).

In spite of these and other related advances, network reliability still remains an outstanding issue. Although redundant architecture ensures that there is duplicate hardware that can be pressed into action when a switchover is to be effectuated due to a failure in the node's active side, there is no certainty that the duplicate hardware in the node's standby side is error-free. It is possible that the standby hardware may exhibit what are known as "silent failures"—failures which show up on a network board only when it goes active, not when the board is first installed. Although the occurrence of such failures may be somewhat rare, the effect is nevertheless devastating, resulting not only in the loss of traffic, but also in the diminution of the network operator's prestige and the trust it places in the equipment manufacturer.

One approach to address this problem is to utilize whatever diagnostic capability that the existing software operable to control the network card may have, in order to run appropriate tests on the card to ensure that there are no failures. A significant disadvantage in this approach is that the existing software's diagnostic capabilities may not be suitable for testing the board-level or backplane-level hardware, where test patterns are typically required to traverse only several inches or so. For example, where SONET-capable equipment is deployed, the SONET software running on the network cards is operable to detect failures in signals that traverse several miles (i.e., long-delay loops). Accordingly, such test software is necessarily equipped with broader tolerances, which renders the diagnostic methodology rather insensitive for testing the much shorter distances (i.e., short-delay loops) required for the board-level or backplane-level components.

Another solution involves modifying the existing software to include the capability to test hardware disposed on short-delay test loops. However, this approach results in incorporating extensive changes in legacy software, which can ultimately lead to the instability of the software itself. Furthermore, the type and number of tests that can be performed without creating too many changes is limited as a consequence.

SUMMARY OF THE INVENTION

Accordingly, the present invention advantageously provides a system and method for conducting diagnostic tests on a network card disposed in a telecommunications node without the aforementioned deficiencies and shortcomings. Preferably, the telecommunications node is operable as a network element disposed in an access network for effectuating a loop carrier system for a plurality of subscribers. In a presently preferred exemplary embodiment of the present invention, the network element is provided as a SONET-capable node having a redundant architecture and operable with various Optical Carrier (OC) signals such as, e.g., OC-3, OC-12, et cetera.

A diagnostics module, preferably embodied as an interrupt level automaton, is launched at predetermined intervals by a base level automaton or automata under the control of an executive scheduler running on a standby network card, e.g., a SONET formatter card, disposed in the network element. The network card is initially in a provisioned configuration mode operable to transmit and receive SONET communication traffic therethrough. Upon determining by the base level diagnostics automaton to install the diagnostic application automaton, the network card is reconfigured into a loopback configuration mode involving a predefined loopback path in the telecommunications node. Operations relating to the telecommunications traffic are suspended in the loopback mode, whereby one or more diagnostic tests may be performed by the installed diagnostic application by injecting appropriate test patterns at specific locations in the loopback path. Upon completing the diagnostic tests, the network card is reconfigured into the provisioned configuration mode in order to commence the communication traffic.

Preferably, the loopback path is effectuated by cross-connecting a transmit path and a receive path in a cross-connect module disposed on the network card. In one exemplary embodiment, the loopback path may involve only the network card circuitry. In another exemplary embodiment, the loopback path may involve one or more optical assemblies of the node in addition to the standby network card such that the loopback path traverses a backplane to which the network cards are coupled. In a still further exemplary embodiment, the loopback path involves two de-coupled loopback path portions capable of independently testing different portions of the telecommunications node. For instance, one loopback path portion emanates from the optical assembly, traverses the backplane, and loops back via the cross-connect module on the network card to terminate in the optical assembly. The other loopback path portion involves a transmit/receive path pair disposed on the network card, which path pair is cross-connected via the cross-connect module.

As a further variation, the system and method for conducting diagnostic tests in the telecommunications node may involve a post-loopback "shock absorber" mode which allows for a predetermined delay before the network card is operable to commence the communication traffic in the reconfigured provisioned mode. The predetermined delay, e.g., 20 to 50 milliseconds, ensures that no transients in the network card's circuitry due to the diagnostic testing are present when the provisioned traffic is commenced.

In another aspect, the present invention is directed to a computer-accessible medium (such as, for example, software or firmware stored in a memory device) operable with a telecommunications node disposed in an access network. The computer-accessible medium is further operable to carry a sequence of instructions which, when executed by at least one processing entity associated with the telecommunications node, cause to be performed at least a portion of the steps of the diagnostics scheme set forth hereinabove.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
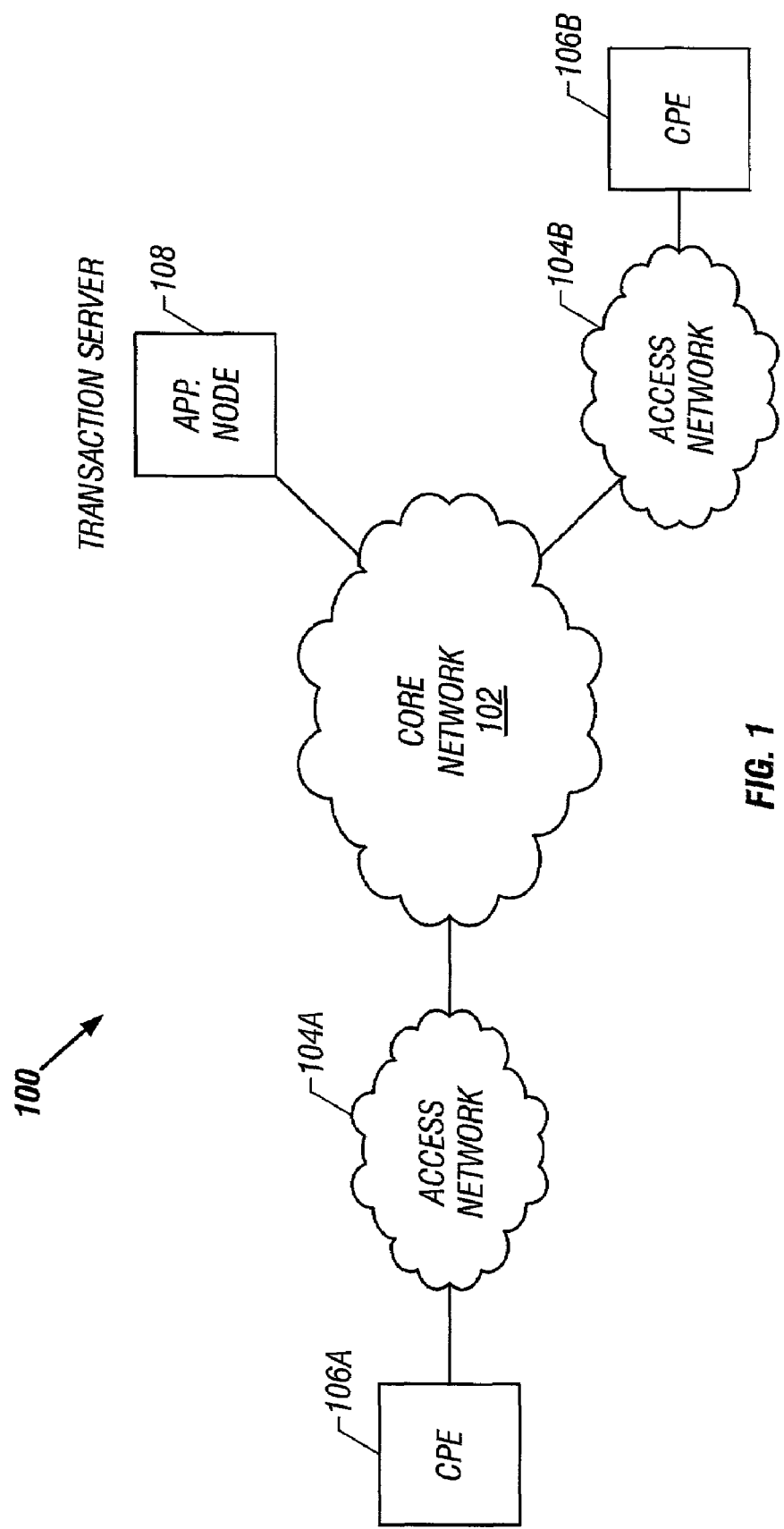
FIG. 1 depicts an exemplary telecommunications network arrangement having an access network portion wherein the teachings of the present invention may be advantageously practiced.

In the drawings, like or similar elements are designated with identical reference numerals throughout the several views thereof, and the various elements depicted are not necessarily drawn to scale. Referring now to FIG. 1, depicted therein is an exemplary network arrangement 100 having one or more access network portions wherein the teachings of the present invention may be advantageously practiced. The exemplary network arrangement 100, comprising a core transport network 102 and access network portions 104A and 104B, is preferably operable to support telecommunications, data communications, or any combination thereof involving diverse media such as voice, audio, video, graphics, data, and assorted multimedia. The core transport network 102 may be provisioned as a circuit-switched network (CSN), packet-switched network (PSN), or an integrated hybrid network. In an exemplary embodiment, the Public Switched Telephony Network (PSTN) (for wireline communications), the Public Land Mobile Network (PLMN) (for wireless communications), or any combination thereof may be provided as the CSN. Where the core network 102 is implemented as a packet network, it may preferably be comprised of a network operable with Internet Protocol (IP), Frame Relay, ATM, and/or other applicable technologies.

The access network portions 104A and 104B are disposed between end users (i.e., subscribers) exemplified by customer premises equipment (CPE) 106A, 106B, and the core network 102. It should be appreciated that although isolated CPE units are illustrated in this FIG., they may also be disposed in a private network such as a home area network (HAN), customer premises network (CPN), or a premises distribution network (PDN). The access network portions 104A, 104B are operable to provide remote access to the subscribers by means of various Point-of-Interface (POI) nodes and Point-of-Presence (POP) nodes interconnected via any suitable wireline, wireless, narrowband, or broadband local network. By way of example, such a local network may be implemented using well known technologies such as the Integrated Services Digital Network (ISDN), Digital Subscriber Line (DSL) and its variants, Fiber In The Loop (FITL) and its variants, Hybrid Fiber/Coaxial (HFC) cable technologies, or Wireless Local Loop (WLL) technologies. Additionally, the exemplary access network portions 104A and 104B may be comprised of a converged local network in further embodiments of the present invention.

Continuing to refer to FIG. 1, reference numeral 108 refers to a transaction server provided as an application node that is exemplary of a service provider operable to provide various telecom, datacom and/or integrated multimedia services to the subscribers. It should be appreciated by those skilled in the art that although the exemplary application node 108 is illustrated as a single isolated node directly coupled to the core network 102, a private network comprising the application node 108, among others, may be provided with its own POI infrastructure in relation to the core network 102.

In a presently preferred exemplary embodiment of the present invention, the access network portion (e.g., access network 104A or 104B) is provided as a fiber-based loop carrier system that can be implemented in various embodiments depending on cost, availability of appropriate local infrastructure, services supported, etc. For example, implementations such as Fiber To The Home (FTTH), Fiber To The Curb (FTTC), Fiber To The Neighborhood (FTTN), and other FITL variants may be architected as a digital loop carrier (DLC) for providing integrated, broadband access services to the subscribers.

Figure 2:
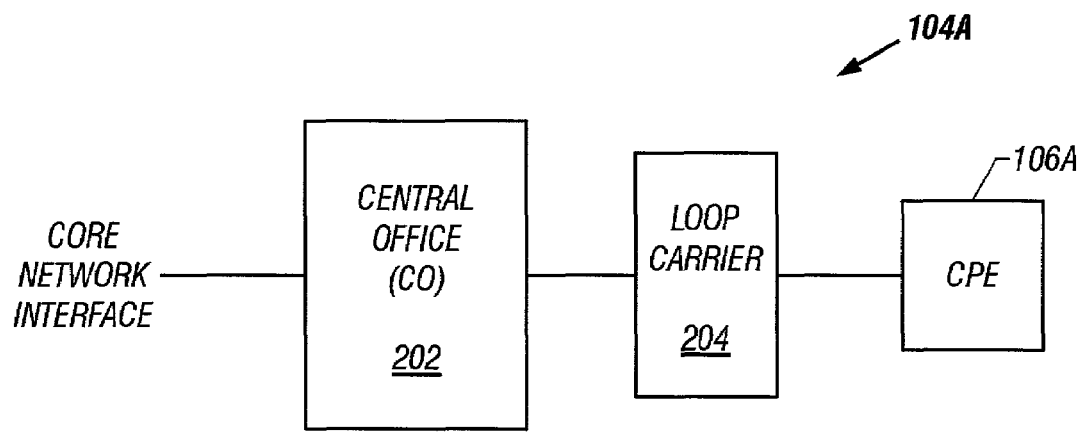
FIG. 2 depicts a high level conceptualization of an access network portion involving a loop carrier in conjunction with a central office.

The fiber-based loop carrier system is preferably at least operable with a suitable physical layer infrastructure such as the Synchronous Optical Network (SONET) technology or its companion, the Synchronous Digital Hierarchy (SDH), which is similar to SONET except that its multiplexing hierarchy is a subset of the SONET multiplexing scheme. FIG. 2 depicts a high level conceptualization of the exemplary access network portion (e.g., access network 104A) involving a loop carrier 204 in conjunction with a central office (CO) 202. Exemplary CPE, for instance CPE 106A, is coupled to the loop carrier 204 operable to multiplex the access loop signal between the equipment and the CO with other loop signals. The POI equipment located at the CO is operable, in turn, to provide interface connectivity to the core network.

In accordance with the SONET requirements, the loop carrier 204 is preferably operable with a broad range of Optical Carrier (OC) signals, e.g., OC-3, OC-12, OC-48, et cetera, and the electrical equivalents corresponding thereto, namely, Synchronous Transport Signal (STS)-3, STS-12, STS-48, et cetera. SONET, as the name implies, uses a synchronous transmission scheme, with a SONET frame transmitted every 125 microseconds. Each frame is logically organized as a two-dimensional array of bytes whose size is dependent on the channel rate. The basic SONET channel is an STS-1 (corresponding to OC-1) which consists of frames that have 810 bytes organized in 9 rows by 90 columns. At 8,000 frames per second, this gives a raw channel rate of 51.84 Mbps. Since the overhead for managing SONET line and section equipment consumes 3 of 90 columns (leaving 87 columns of payload, called the Synchronous Payload Envelope or SPE) and the path overhead typically comprises one column, a net user data rate of 49.536 Mbps (86 columns×9 rows×8 bits×8000 frames/second) is available per STS-1 channel.

Data rates higher than STS-1 are obtained by multiplexing multiple STS-1 signals. For example, three STS-1 signals can be byte-interleaved to form an STS-3 signal that operates at 155.52 Mbps. Another form of multiplexing is to concatenate the overhead and payload bytes of multiple STS-1 signals, for example, where an STS-3c frame contains 9 overhead columns and 261 columns for the SPE, giving rise to the data rate of 155.52 Mbps. In the general case, an STS-n frame is an electrical signal having n-tuples of STS-1 frames which, when modulated over an optical carrier, is referred to as an OC-n optical signal.

Transmission rates lower than STS-1 can be obtained by subdividing the payload into what are known as Virtual Tributaries (VTs) which can support data rates from Digital Signal (DS)-1 (operating at 1.544 Mbps) to DS-2 (6.312 Mbps). An STS-1 signal can be logically divided into VTs having separate identities, whereby each VT is operable to carry the same amount of payload through the fiber. Because the data within each VT retains its own ID, it can be easily separated from the rest of the STS-1 signal. Accordingly, where a loop carrier system traverses a number of nodes, appropriate VTs may be "dropped" at each node for processing. VTs are also useful when a SONET-based access network interfaces with another network based on the Pleisochronous Digital Hierarchy (PDH) which is built upon DS-0 (64 Kbps) channels.

Figure 3:
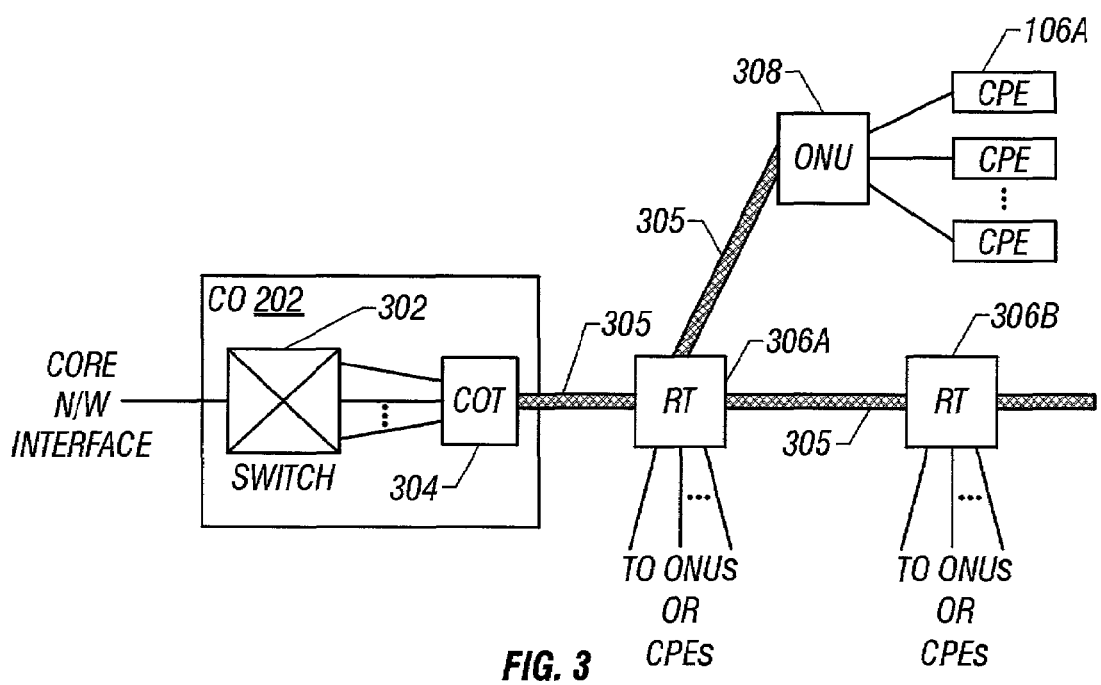
FIG. 3 depicts an exemplary embodiment of a loop carrier system having a plurality of nodes (or, terminals) wherein the diagnostics scheme of the present invention may be advantageously practiced.

Referring now to FIG. 3, depicted therein is an exemplary embodiment of a fiber-based loop carrier system having a plurality of nodes wherein the diagnostics scheme of the present invention may be advantageously practiced. The loop carrier nodes, which may also be referred to as access network nodes or terminals (more generically, telecommunications nodes), may be organized in one of several topologies for purposes of the present invention and are comprised of two forms depending on their location in the access loop. When co-located at a CO, the loop carrier node is referred to as a central office terminal (COT). Reference numeral 304 exemplifies a COT coupled to a CO switch 302 that forms part of CO 202. Other loop carrier nodes external to the CO are referred to as remote terminals (RTs), e.g., RT 306A and 306B.

Fiber paths 305, preferably operable to carry signals of OC-3 or higher rates, are used for interconnecting the COT and RTs in a particular topology. Where only one RT is coupled to the COT, the resultant two-node arrangement is referred to as a point-to-point loop carrier system. On the other hand, if multiple RTs are coupled in a linear fashion, either a single feeder multiple RT (MRT) system or a dual feeder MRT system may be obtained. In a single feeder MRT system, the RTs are located on only one side of the COT, as exemplified in this FIG. In the dual feeder MRT system, the RTs are disposed on both sides of the COT, which sides are conventionally referred to as "East" and "West" sides. Accordingly, fiber optic cables emanate from the COT and run in two different directions relative thereto, each branch feeding one or more RTs.

In a further exemplary embodiment, the loop carrier system may be arranged in a ring topology. For example, a unidirectional path switched ring (UPSR) topology is obtained where the westernmost and easternmost nodes of a dual feeder MRT are connected to each other. As a matter of convention, the East direction from the COT carries the communication traffic, whereas the West direction from the COT is provided as the "protect" direction, in case the East direction cable is cut or its performance degrades to a predetermined level.

In addition to the COT and RT access loop nodes, the exemplary loop carrier system may also include other equipment such as Optical Network Units (ONUs) that serve end users that are far enough away from each other that it isn't economical to connect all of them to an RT. The ONUs are operable to convert the signals between electrical and optical domains, if necessary. Also, the ONUs digitize the analog communication signals from a plurality of customers and multiplex them onto a piece of fiber coupled to the RT. In FIG. 3, reference numeral 308 refers to an ONU that is coupled to RT 306A and serves, by way of example, CPE 106A. Further, an RT in the loop carrier system may be coupled to one or more ONUs and RTs, in addition to the CPEs directly served by the RT.

It should be appreciated by those skilled in the art that an ONU is functionally similar to a "miniature" RT capable of handling a small number of communication circuits. An ONU-12 is provided with three line cards, operable to support 12 POTS circuits. A total of 24 line cards are deployed in an ONU-96 for supporting 96 POTS circuits. Because of the functional similarity between the ONUs and COT/RTs, it is convenient to refer to ONUs and COT/RTs together as "access network elements" in general.

Figure 4:
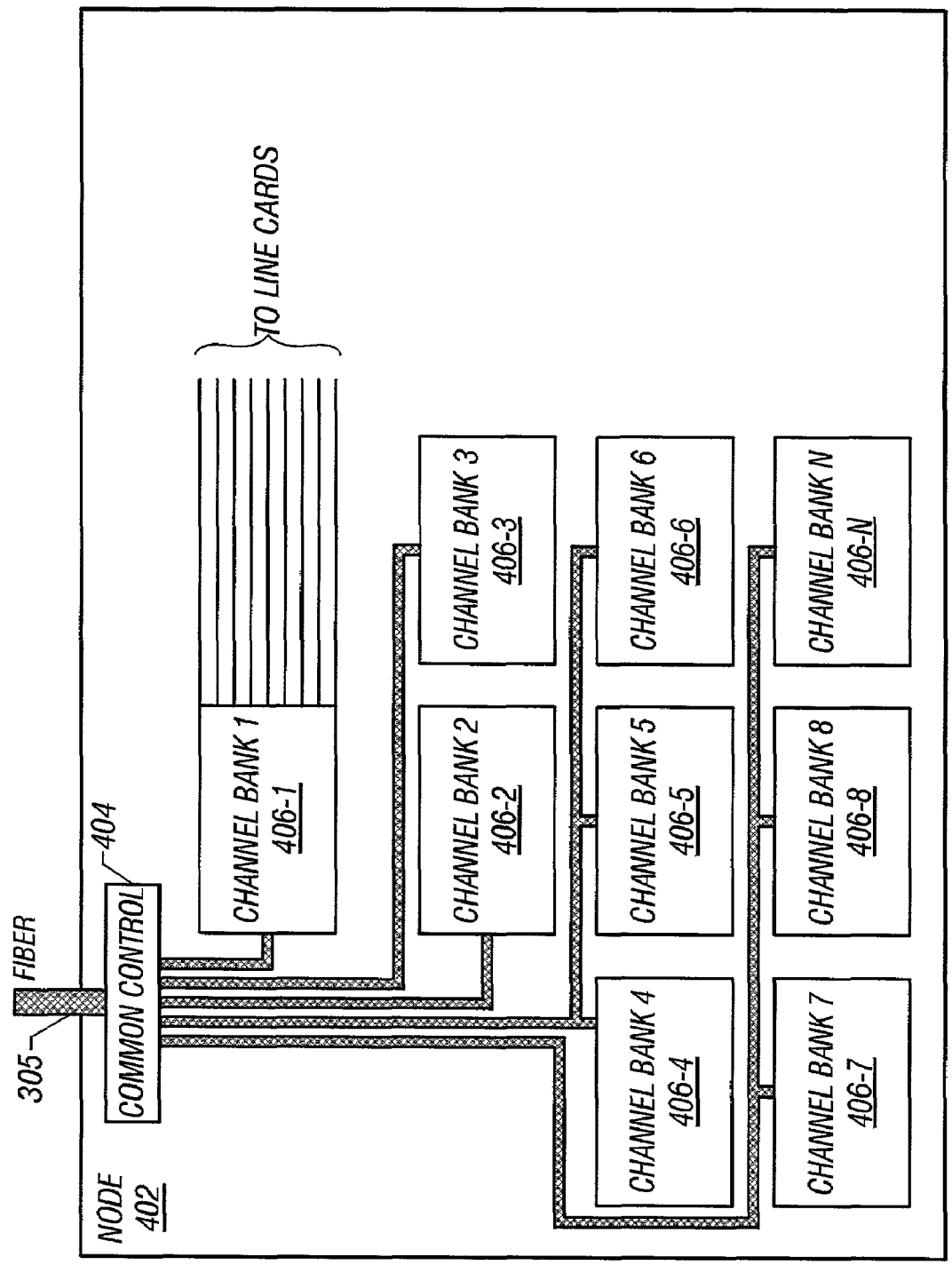
FIG. 4 depicts a high level functional block diagram of an exemplary node.

FIG. 4 depicts a high level functional block diagram of an exemplary access node 402. A common control subassembly portion 404 is responsible for configuring the flow of data between a fiber path (e.g., fiber path 305) to which the access node coupled and a plurality of subscriber banks, which comprise channel banks (containing line cards the communicate directly with the CPE) and fiber banks (containing cards that the communicate with the fiber path disposed between RT and ONU or between RT and COT). Reference numerals 406-1 through 406-N exemplify a plurality of channel bank subassemblies in the node 402, each of which is operable to extract a portion of the signal from the common control subassembly, and route it out to the CPE via the line cards associated therewith (not explicitly shown).

Preferably, the node 402 is normally configured as a duplex node, that is, its critical equipment is deployed with redundancy (with at least two copies) in order to facilitate switchover, wherein the standby side is available to take over if the equipment on the active side fails for some reason. The common control subassembly 404 is comprised of a duplex section (subject to switchover) as well as a shared equipment section (not subject to switchover). The duplex section comprises a pair of Terminal Control Processors (TCPs) that control the overall operation of the node 402. Also included in the duplex section is, among others, system backup memory, preferably implemented as electrically erasable programmable read-only memory (EEPROM), which contains both system software as well as a provisioning database.

Figure 5:
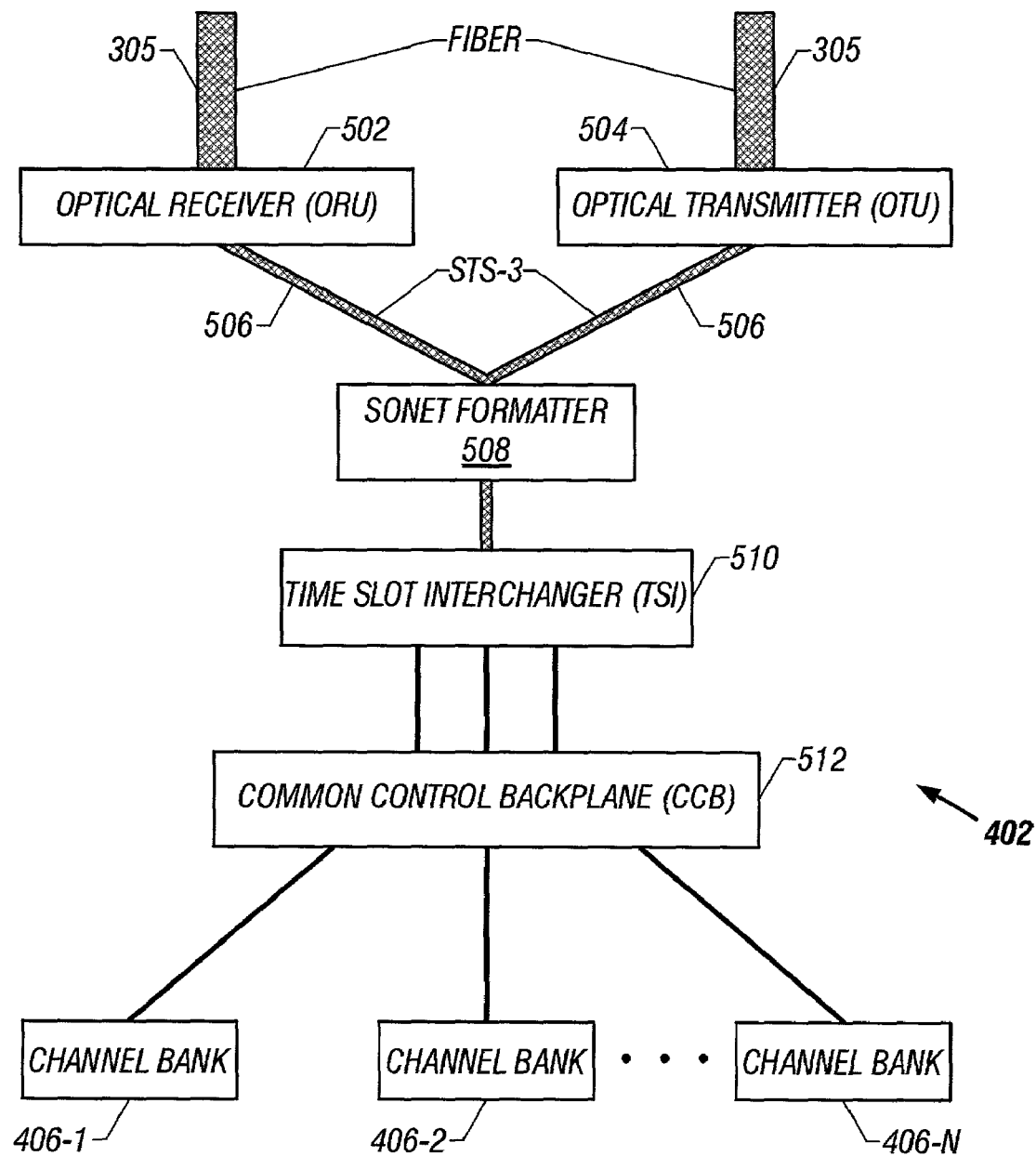
FIG. 5 depicts additional details of the exemplary SONET-capable node shown in FIG. 4.

The provisioning database preferably contains information regarding the node's configuration such as local cross-connection maps, equipment deployed, interface groups, et cetera. FIG. 5 depicts a functional block diagram of the exemplary SONET-capable node 402 with additional detail. Optical receiver units (e.g., ORU 502) and optical transmit units (e.g., OTU 504) are preferably provided as high-speed unit (HSU) optical assemblies with redundancy that directly interface to the fiber path 305. The ORU 502 is operable to receive an OC-n signal and convert it into its STS-n electrical equivalent. Similarly, the OTU 504 is operable to convert an STS-n signal and convert it into the OC-n carrier signal associated therewith. For example, where an OC-3 carrier signal is employed for transmission on the fiber paths 305, the ORU and OTU assemblies are provided with the capability to operate with STS-3 signals propagated on electrical paths 506 associated therewith.

Figure 6:
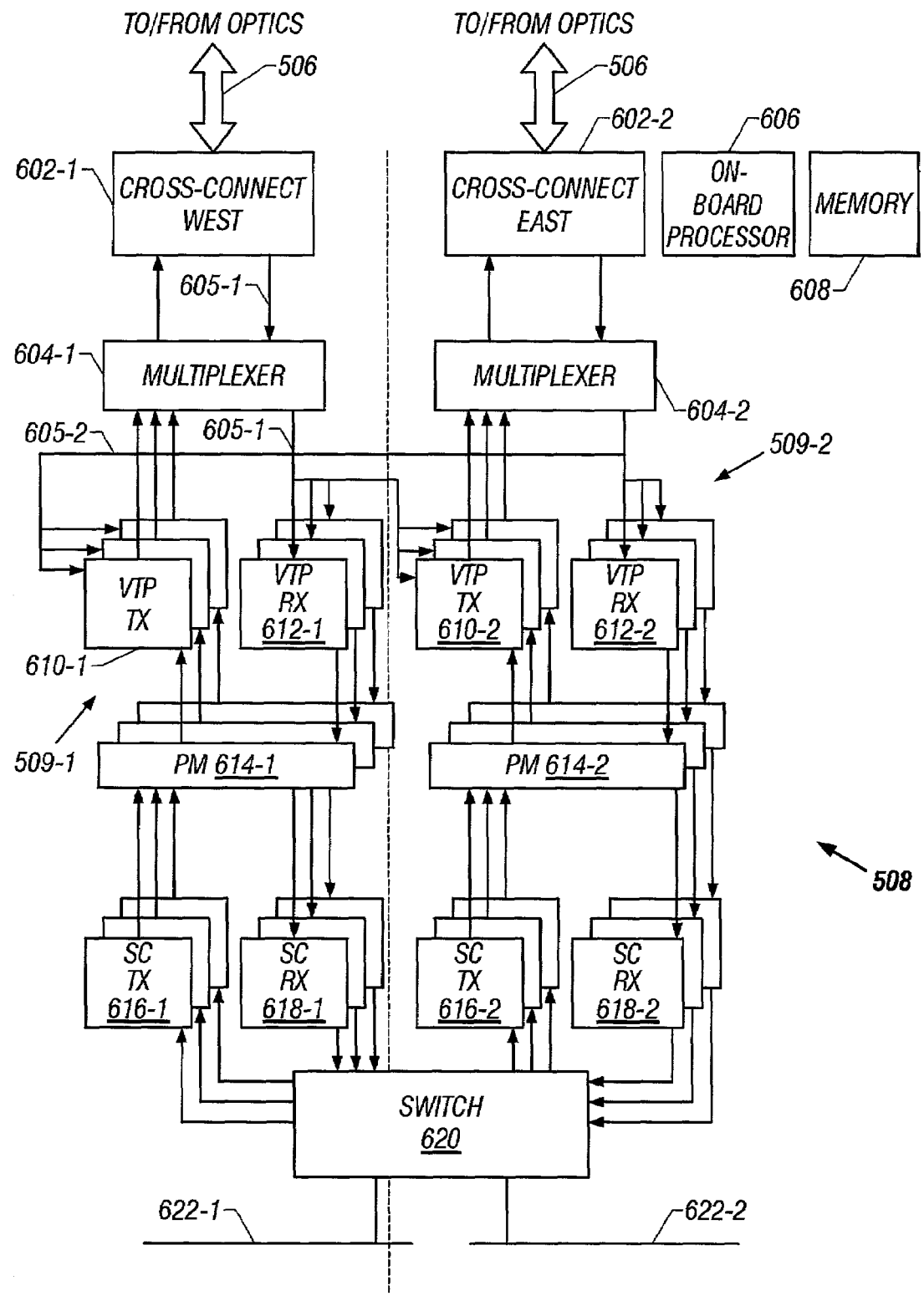
FIG. 6 depicts a functional block diagram of a presently preferred exemplary SONET formatter card capable of conducting diagnostic tests in accordance with the teachings of the present invention.

The optical assemblies 502 and 504 are coupled via the electrical paths 506 to a SONET formatter assembly comprising a plurality of formatter cards 508 which are operable to accept communication signals from Time slot Interchanger (TSI) cards 510 and convert them into appropriate STS-n signals. A common control backplane (CCB) 512 is provided for coupling the TSI cards, formatter cards, and the OTU/ORU cards on a common motherboard. The channel bank assemblies 406-1 through 406-N, which may be populated with different line cards for supporting various kinds of communication services, are coupled to the CCB via appropriate cabling.

Where a ring topology is deployed, the formatter card 508 is preferably provided as a double-wide card that plugs into both East and West positions in a common control shelf of the access node. Referring now to FIG. 6, depicted therein is a hardware-based functional block diagram of a presently preferred exemplary embodiment of the SONET formatter card 508 capable of conducting diagnostic tests in accordance with the teachings of the present invention. As alluded to hereinabove, because the access network node 402 is preferably deployed in a ring-topology-based loop carrier system having an East side and a West side, the formatter cards are provided with East-side circuitry 509-2 and West-side circuitry 509-1, wherein each side is provided with two operational planes, A or B, in accordance with the node's redundant architecture. Since either of the planes may be active at any time, a formatter card may be in an active mode or a standby mode depending on whether revenue-bearing SONET communication traffic (i.e., SONET's electrical equivalent STS frames, either multiplexed or not) is being transported through its East and West sides. Although the standby mode involves transporting the SONET traffic, it is primarily used for path monitoring and for facilitating traffic commencement upon a switchover.

A cross-connect matrix module disposed on each side, reference numerals 602-1 and 602-2, respectively, is coupled to East and West optical assemblies (not shown in this FIG.) via electrical paths 506 that are preferably operable to carry multiplexed STS signals. Each cross-connect module is associated with a module operable to multiplex STS-1 frames into higher hierarchies such as STS-3 signals. Reference numerals 604-1 and 604-2 refer to West-side and East-side modules, respectively, provided for carrying out this multiplexing function, preferably via byte-interleaving an appropriate number of STS-1 frames. Further, the modules 604-1 and 604-2 are operable in the receive path (i.e., from the optics to the channel banks) to monitor each of the three STS-1 signals received from the respective cross-connect blocks (six STS-1 signals in two groups) associated therewith for various errors, signal labels, etc., and to select three of them for transporting separately to a receive (RX) virtual tributary (VT) processor (VTP) each. Reference numerals 612-1 and 612-2 refer to West-side and East-side RX-VTPs provided in triplets. Preferably, the functionality of RX-VTPs includes terminating STS-1 path overhead, signal label identification, etc., among others. In the transmit path (i.e., from the channel banks to the optics), each side of the formatter board 508 is provided with a transmit (TX) VTP (reference numerals 610-1 and 610-2) for creating STS-1 path overhead, generating signal labels, etc. for an outbound VT. Since three STS-1 signals are preferably multiplexed, both East-side and West-side TX-VTPs are provided in triplets as well. For through traffic, i.e., payload not directed to the channel banks of the node, separate paths 605-1 and 605-2 are provided for coupling the receive path of one side to the transmit path of the other side.

Continuing to refer to FIG. 6, a performance monitoring (PM) module is provided on each side (reference numerals 614-1 and 614-2) for monitoring each STS-1 channel on the receive path and transmit path. A signal converter (SC) module may also be disposed separately on the receive and transmit paths for appropriately converting the VT signaling of STS-1 channels if a different signal format is used internally within the access telecommunications node. Reference numerals 616-1 and 616-2 refer to the West-side and East-side transmit path SC modules disposed on the formatter board 508. Similarly, reference numerals 618-1 and 618-2 refer to the West-side and East-side receive path SC modules, respectively.

A "space" switch 620 is disposed between the East and West sides of the formatter board 508 for selecting appropriate active VT channels in accordance with the ring topology of the loop carrier system within which the access node is deployed. Accordingly, the space switch 620 is coupled to the SC-RX and SC-TX modules of each side in the direction of the optics. In the direction of channel banks, a pair of space-partitioned buses 622-1 and 622-2 are coupled to the space switch 620, which buses are connected to the TSI 510 (shown in FIG. 5) disposed on the CCB. As described hereinabove, the channel banks are in turn coupled to the TSI via appropriate cabling provided with the CCB.

Still continuing to refer to FIG. 6, an on-board processor 606 is provided for controlling the operation of the formatter board 508. A suitable memory assembly 608 is provided in connection therewith for storing the appropriate software. In a presently preferred exemplary embodiment, the memory assembly 608 is comprised of static random access memory (SRAM) as well as Flash memory, wherein instructions are provided for performing normal SONET operations (i.e., SONET software) and diagnostic tests (i.e., diagnostic software) in accordance with the teachings of the present invention, as will be described in greater detail hereinbelow.

It should be appreciated that the architecture of the SONET formatter board 508 set forth in the foregoing may be realized in multiple hardware implementations. Preferably, the various components comprising the receive and transmit paths of each side of the formatter 508 may be implemented as application specific integrated circuits (ASICs) which can be tested by the diagnostic software when the paths are not being utilized for SONET operations.

Figure 7:
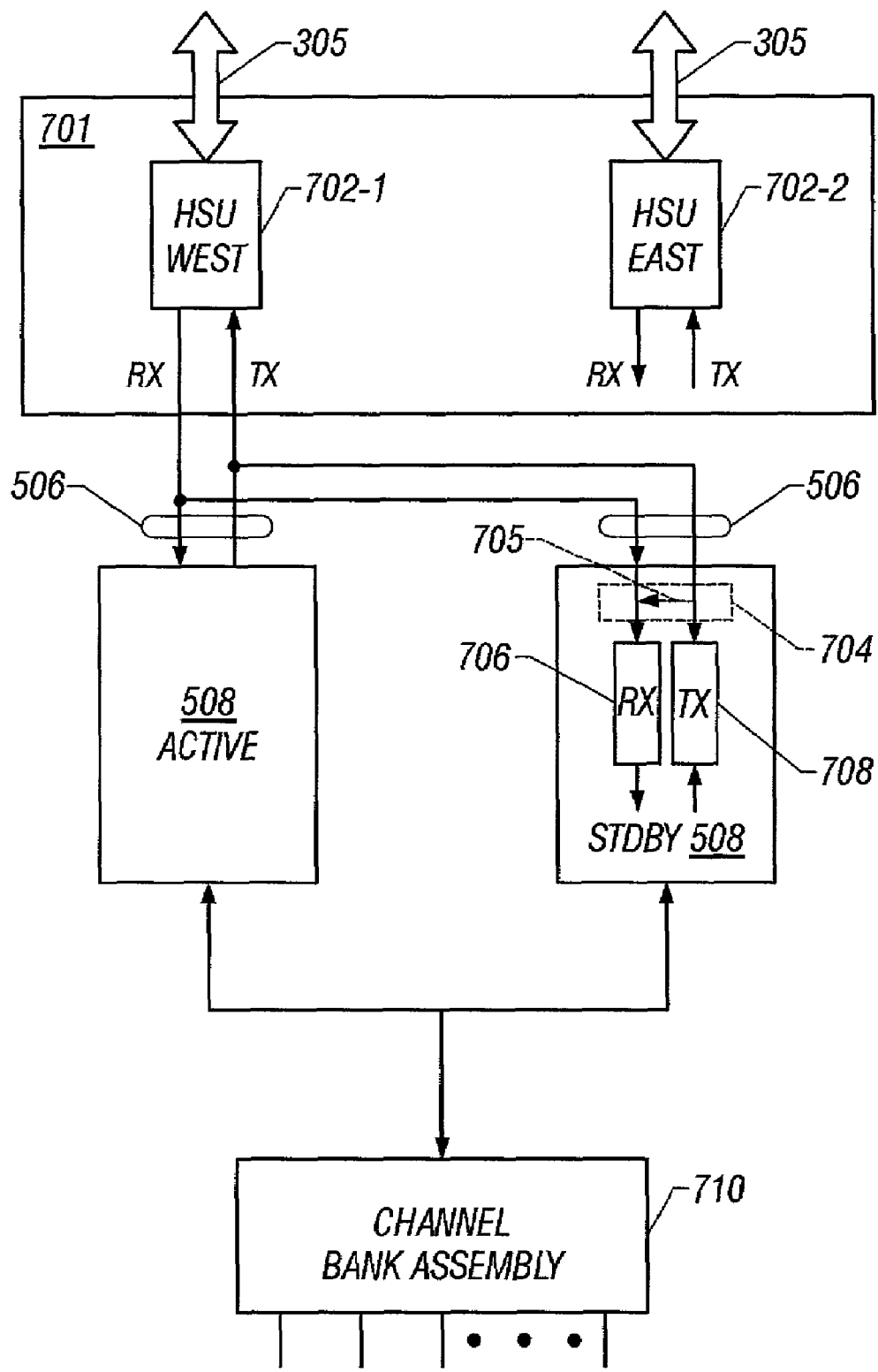
FIG. 7 depicts a high level functional block diagram of the node with an exemplary standby card for performing diagnostics.

FIG. 7 depicts a high level functional block diagram of the node with an exemplary standby formatter 508 for performing diagnostics. Reference numeral 701 refers to an optical assembly having a West-side HSU 702-1 and an East-side HSU 702-2 for interfacing with the fiber paths 305. For the sake of clarity, only West-side signal paths are exemplified in this FIG. Reference numeral 506 refers to the STS-3 paths disposed between HSU 702-1 and active/standby formatter cards 508. The cross-connect functionality of the standby formatter card 508 is exemplified by a generalized cross-connect block 704 which, in turn, is coupled to a generalized receive path 706 and a generalized transmit path 708. A generalized channel bank assembly 710 is in a bidirectional communication relationship with the active/standby formatter cards 508.

Because of the redundant architecture, either of the active or standby SONET formatter cards is operable to run the software for normal SONET operations as well as the diagnostic tests. In order to perform the normal operations using the SONET software, the cards are configured in a provisioned configuration mode based on TCP control. For conducting the diagnostic tests in the standby formatter board, a loopback configuration mode is effectuated by utilizing the cross-connect functionality of the board, wherein the transmit path is looped back to the receive path as exemplified by a loopback path portion 705. Thereafter, appropriate test traffic having predetermined patterns may be injected into the transmit path 708 at various test points depending on the hardware sections to be tested, which test traffic can be collected on the receive path side 706 via the loopback path for error detection and analysis.

Figure 8:
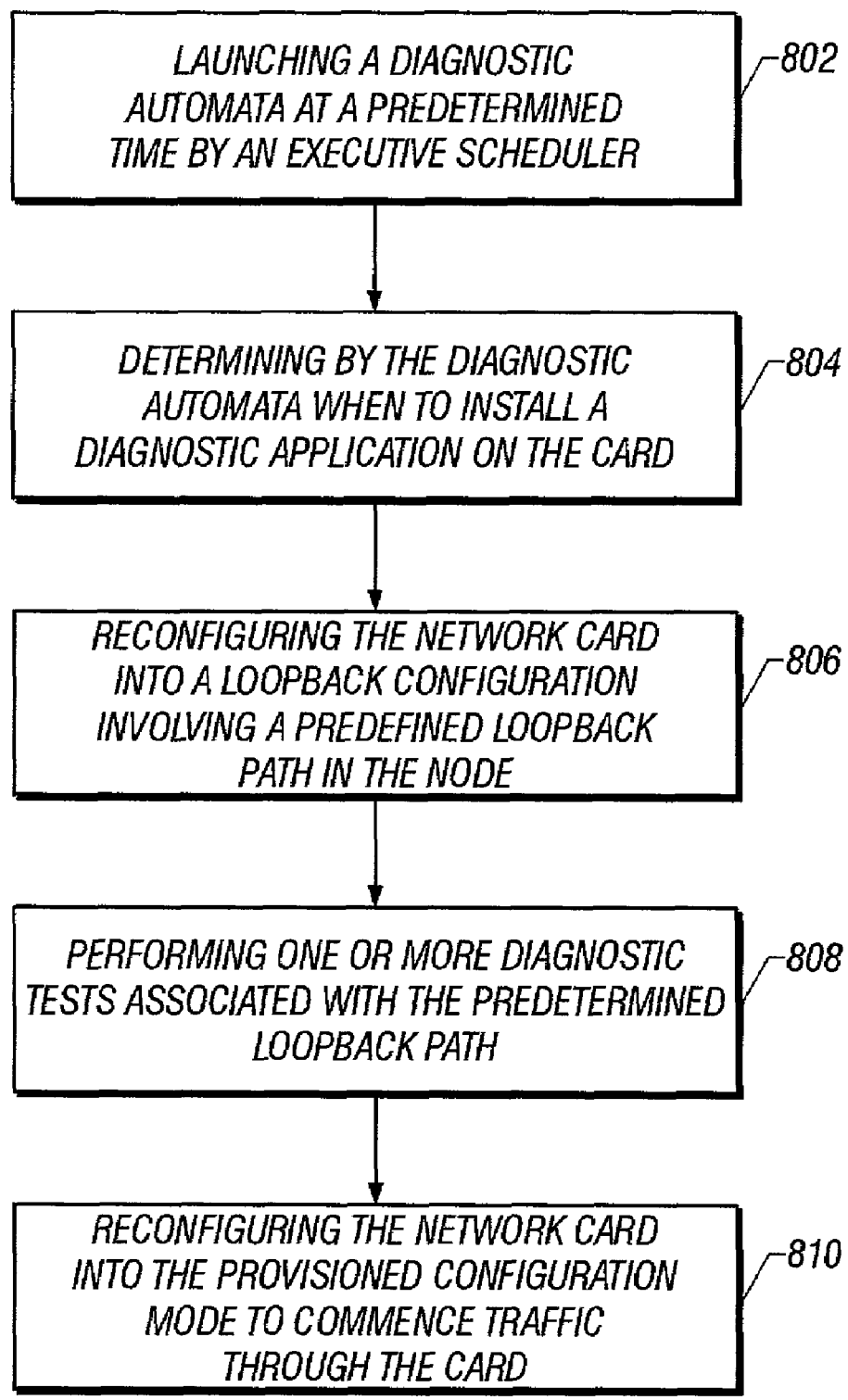
FIG. 8 is a flow chart of the various steps involved in a diagnostics scheme provided in accordance with the teachings of the present invention.

FIG. 8 is a flow chart of the various steps involved in a diagnostics scheme provided in accordance with the teachings of the present invention. Preferably, the diagnostic scheme is implemented as a base level automaton or automata that can be executed under the control of a master scheduler running on the formatter board initially in a provisioned configuration mode. In a presently preferred exemplary embodiment of the present invention, the diagnostic automaton is operable to be launched at the same time as the SONET software, where the automaton is initially responsible for monitoring the passage of time. A global variable indicative of the board's operational state may be implemented to indicate whether the board is in a diagnostic state or in a normal SONET operation state. Upon launching the diagnostic automaton at a predetermined time (step 802), a determination is made thereby as to when a particular diagnostic application should be installed (step 804). The network card, i.e., the formatter card, is reconfigured into a loopback configuration mode involving a predefined loopback path in the access node in which the card is disposed (step 806). Preferably, the loopback path includes circuitry or components disposed on a transmit/receive path loop that is operable to be tested using the installed diagnostic application. Upon performing one or more diagnostic tests associated with the predefined loopback path (step 808), the network card is reconfigured into the provisioned configuration mode whereby the communication traffic is recommenced (step 810).

Figure 9:
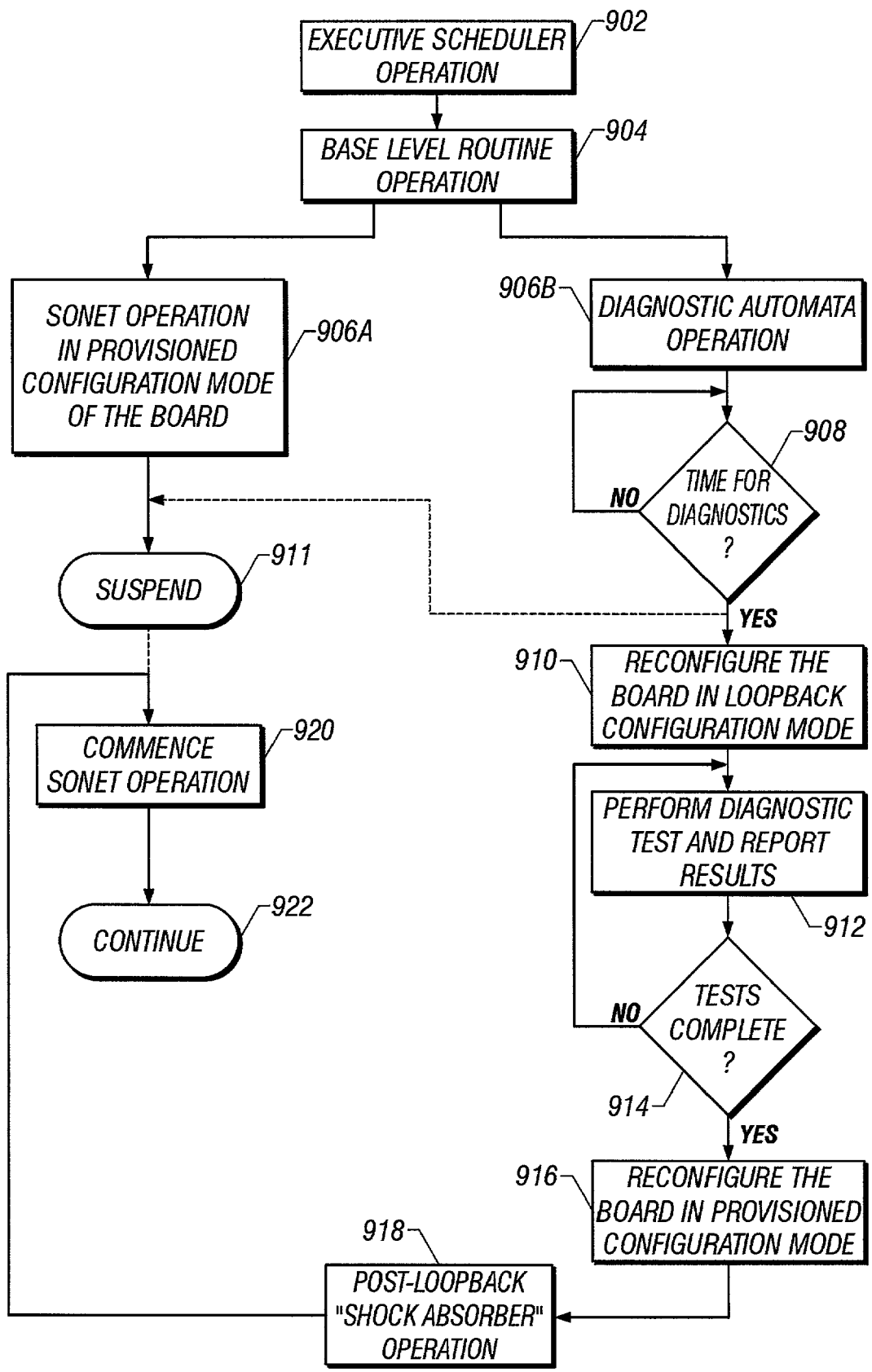
FIG. 9 is a flow chart of the steps involved in a presently preferred exemplary method in accordance with the teachings of the present invention.

FIG. 9 is a flow chart of the steps involved in a presently preferred exemplary method of conducting diagnostic tests in a network card in accordance with the teachings of the present invention. As pointed out in the foregoing, an executive scheduler, e.g., an embedded real-time operating system (RTOS)-based master application, controls the overall operation of the network card (step 902). Also, the diagnostic automaton or automata is/are launched by the scheduler as part of the board's base level operation (step 904). In the normal provisioned configuration mode established under TCP's configuration data, the board is operable to transport SONET communication traffic therethrough and the SONET software is operable to process such traffic appropriately (step 906A). The base level diagnostic automata operation (step 906B) preferably includes the monitoring of time for determining when to conduct diagnostic tests. After a suitable time interval has elapsed, e.g., one second, as determined by decision block 908, the formatter board is reconfigured into a loopback configuration mode (step 910) whereby the existing interrupt routine is detached and a diagnostic interrupt routine is attached. Base level SONET routines are no longer called by the master scheduler and, accordingly, the SONET operations on the board are also suspended in the formatter (step 911). The global operational state variable may suitably be modified to indicate that the diagnostic software, rather than the normal SONET software, is running on the board.

A pseudo-code portion exemplifying the operation of the base level diagnostic automaton is set forth below:

```
DiagExecStbyAuto ( )
{
    switch BlState:
        Case Waiting Lp:
            Time to install diagnostics?
            Yes, install loopback in one matrix attach DiagIsr
            set OperState to Diagnostic
        ... }
```

The diagnostic interrupt routine is also preferably implemented as an automaton or automata for performing various tests on the loopback path. The results of the tests are reported to the base level diagnostic automata (step 912). A pseudo-code portion exemplifying the operation of the interrupt level diagnostic application routine is immediately set forth below:

```
DiagOneMslsr ( )
{
  switch lsrState:
    case Init:
      absorb transients
      . . .
    case StartTest:
      start first test
      . . .
    case LastTest:
      . . .
    Case ReportToBaseLevel:
      wait for base level to reconfigure
      . . .
}
```

Upon completing the diagnostic tests (decision block 914), the formatter board is reconfigured as per provisioned configuration from the TCP (step 916). In the presently preferred exemplary embodiment of the present invention, the SONET routines are not reinstalled immediately, as switching from the loopback configuration of the board to the normal provisioned configuration (operable to receive traffic from the optics) may cause transients in the circuit components of the board's transmit and receive paths, which transients can generate temporary threshold-crossing events in the execution of performance monitoring (PM) sequences. Accordingly, a post-loopback "shock absorber" state is established after the completing the tests (step 918), in which the base level diagnostic automata indicates to the interrupt level routine to clear the latches of the receive path and transmit path hardware. This phase may be referred to as the "post-loopback configuration" mode and can be reflected in the condition of the global operational state variable. The pseudo-code portion for the interrupt level diagnostic routine may therefore be augmented as follows:

```
{
  case StartPostLoopback:
    clear latches
    . . .
  case PostLoopbackFinal:
    . . .
}
```

When the post-loopback phase is completed, the SONET interrupt routine is attached for commencing the normal operations with respect to the re-established SONET traffic (step 920). The provisioned configuration mode continues until the base level diagnostic automata reconfigures the board for conducting the next round of diagnostic tests upon expiration a predetermined time interval (step 922).

As alluded to in the foregoing, the base level diagnostic automata is preferably operable to launch the interrupt level diagnostic application module once every second in order to conduct tests on a predefined loopback path. Preferably, the diagnostic application software can be designed such that it takes no more than 100 milliseconds or so for its execution, including any post-loopback shock absorber delay. Since the TCP (Terminal Control Processor) integration time is greater than this delay by several orders of magnitude, the diagnostic operations can be accommodated with no deleterious effects. If the standby board goes active while the diagnostic software is running, the master scheduler is preferably operable to terminate the base level diagnostics automata and reconfigure the board as per the TCP data. The SONET software is also reactivated thereby. When a provisioning message is issued by the TCP during the diagnostics, the treatment may depend on the message type, the state the board is in, etc. If the message is for provisioning a new STS1 or VT grade of service, it can be handled immediately, as it involves only a modification of the database and no diagnostic tests are affected thereby. If a new STS1 cross-connection message is received with a new cross-connection map (i.e., different from the last one stored in the card database) while the card in the loopback phase, it is stored in the card database and a flag is raised to indicate that the provisioning has been changed. When the diagnostic test phase is completed, the flag is checked to reconfigure the board before going into the post-loopback phase. On the other hand, if the message arrives in the post-loopback phase, it can be implemented without any significant delay. Those skilled in the art should readily appreciate upon reference hereto that other provisioning messages from the TCP can also be handled appropriately while the board is in the diagnostics loop.

Figure 10A:
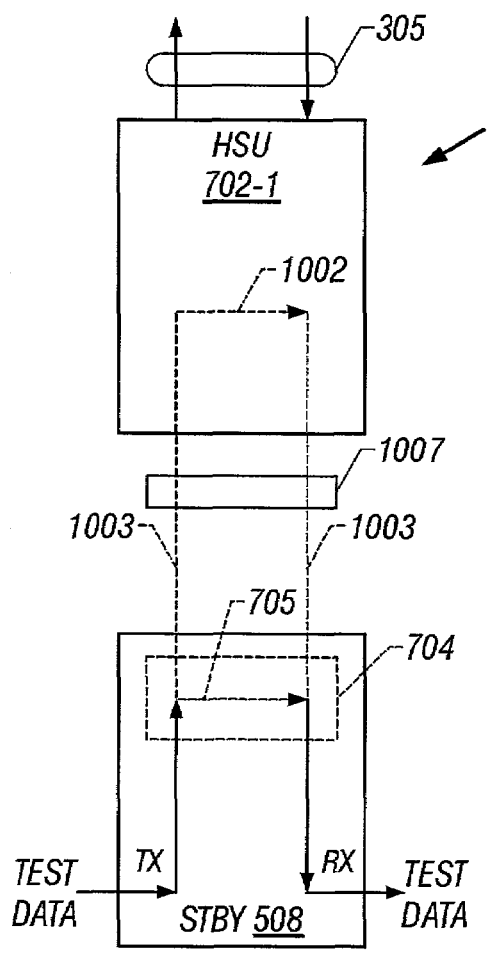
FIGS. 10A and 10B depict additional exemplary loopback path embodiments in accordance with the teachings of the present invention.
Figure 10B:
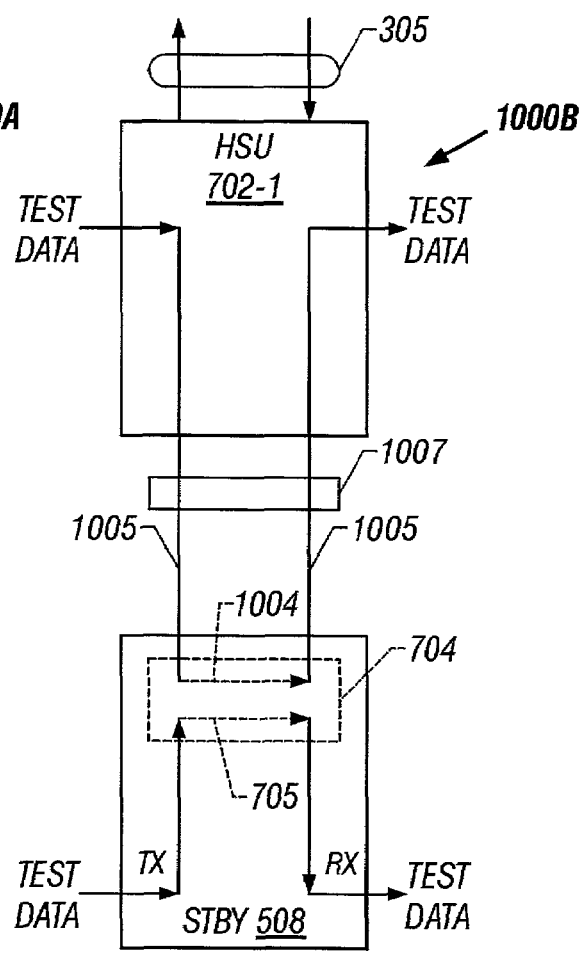

The capability of establishing a loopback path in a telecommunications node (e.g., an access network element) using the cross-connect functionality of the network cards in accordance with the teachings of the present invention gives rise to several loopback implementations wherein different portions of the node can also be advantageously tested for failures. For example, test traffic could be injected into the formatter board towards the space buses and by utilizing the loopback capability of the TSI, a loopback path involving the formatter and TSI cards (thereby the CCB) may be established for conducting various diagnostics. FIGS. 10A and 10B depict two additional exemplary loopback path embodiments 1000A, 1000B involving different portions of the HSU-formatter path. Referring to FIG. 10A in particular, the loopback path of the formatter board is extended across the CCB 1007 to the HSU 702-1 via loopback path portions 1002 and 1003. By inserting test data in the transmit path and looping it back via the HSU on the receive path, the path's hardware can be tested advantageously in accordance with the teachings of the present invention. De-coupled dual loopback paths may be established as shown in FIG. 10B using the cross-connect capability of an active formatter card, wherein external test equipment can be provided for injecting test data into the HSU towards the formatter via a loopback path 1005 involving the HSU 702-1 and the CCB 1007. Reference numeral 1004 refers to a loopback portion established in the card's cross-connect block 704 for the transmit and receive paths involving the HSU. A second loopback path involving the formatter's receive and transmit paths may also be established simultaneously using the cross-connect path portion 705, as has been described in detail hereinabove.

Based upon the foregoing Detailed Description, it should be readily apparent that the present invention advantageously provides an innovative and efficient solution for conducting diagnostic tests on network cards using the existing hardware without negatively impacting the performance. Unlike the conventional SONET test software, which is tailored to detect failures in signals that are propagated over tens of miles, execution of the diagnostic application automata of the present invention involves establishing short-delay test loops that are sensitive to various errors. As pointed out in the Background section of the present patent application, these errors are likely to be undetected by the long-delay test loops of the conventional SONET test methodology. Moreover, the existing SONET software does not have to be modified in order to provide the diagnostic capability that is feasible in the practice of the present invention.

It is believed that the operation and construction of the present invention will be apparent from the foregoing Detailed Description. While the exemplary embodiments of the invention shown and described have been characterized as being preferred, it should be readily understood that various changes and modifications could be made therein without departing from the scope of the present invention as set forth in the following claims.

What is claimed is:

1. A method for conducting diagnostic tests in a telecommunications node including an optics assembly coupled to a plurality of formatter cards, wherein a plurality of channel bank assemblies are coupled via a time slot interchanger (TSI) to said formatter cards, said method comprising the steps:

launching a diagnostics automaton at a predetermined time by an executive scheduler running on a standby formatter card, wherein said standby formatter card is in a provisioned configuration mode operable to transport communication traffic therethrough;

upon determining by said diagnostics automaton to install a diagnostic application, reconfiguring said standby formatter card into a loopback configuration mode involving a predefined loopback path in said telecommunications node and suspending said communication traffic through said standby formatter card, wherein said predefined loopback path involves a transmit path and a receive path in said standby formatter card and a cross-connect path in said optics assembly, said predefined loopback path traversing a backplane to which said standby formatter card is coupled;

performing at least one diagnostic test relating to said predefined loopback path; and upon completing said at least one diagnostic test, reconfiguring said standby formatter card into said provisioned configuration mode in order to commence said communication traffic through said standby formatter card.

2. The method for conducting diagnostic tests in a telecommunications node as set forth in claim 1, wherein said communication traffic is commenced through said network card upon reconfiguration after a predetermined delay.

3. The method for conducting diagnostic tests in a telecommunications node as set forth in claim 2, wherein said predetermined delay is about 20 to 50 milliseconds.

4. The method for conducting diagnostic tests in a telecommunications node as set forth in claim 1, wherein said diagnostic application is installed once every second.

5. The method for conducting diagnostic tests in a telecommunications node as set forth in claim 1, wherein said step of performing at least one diagnostic test involves the step of injecting a predetermined pattern of test traffic at a particular point disposed on said predefined loopback path.

6. The method for conducting diagnostic tests in a telecommunications node as set forth in claim 1, further comprising the step of reporting an alarm to a terminal control processor disposed in said telecommunications node when a failure is detected with respect to said at least one diagnostic test.

7. The method for conducting diagnostic tests in a telecommunications node as set forth in claim 1, wherein said predefined loopback path is effectuated by cross-connecting a transmit path and a receive path in a cross-connect module disposed on said standby formatter card.

8. The method for conducting diagnostic tests in a telecommunications node as set forth in claim 1, wherein said standby formatter card comprises a Synchronous Optical Network (SONET) formatter.

9. A computer-accessible medium operable with a telecommunications node disposed in an access network, said computer-accessible medium carrying a sequence of instructions which, when executed by at least one processing entity associated with said telecommunications node, cause the following steps to be performed:

launching a diagnostics automaton at a predetermined time by an executive scheduler running on a network card disposed in said telecommunications node, wherein said network card is in a provisioned configuration mode operable to transport communication traffic therethrough;

upon determining by said diagnostics automaton to install a diagnostic application, reconfiguring said network card into a loopback configuration mode involving a predefined loopback path therein and suspending said communication traffic through said network card;

performing at least one diagnostic test relating to said predefined loopback path; and upon completing said at least one diagnostic test, reconfiguring said network card into said provisioned configuration mode in order to commence said communication traffic through said network card, wherein said diagnostic application is installed once every second.

10. The computer-accessible medium operable with a telecommunications node disposed in an access network as set forth in claim 9, wherein said communication traffic is commenced through said network card upon reconfiguration after a predetermined delay.

11. The computer-accessible medium operable with a telecommunications node disposed in an access network as set forth in claim 10, wherein said predetermined delay is about 20 to 50 milliseconds.

12. The computer-accessible medium operable with a telecommunications node disposed in an access network as set forth in claim 9, wherein said step of performing at least one diagnostic test involves the step of injecting a predetermined pattern of test traffic at a particular point disposed on said predefined loopback path.

13. The computer-accessible medium operable with a telecommunications node disposed in an access network as set forth in claim 9, further comprising instructions to perform the step of reporting an alarm when a failure is detected with respect to said at least one diagnostic test.

14. The computer-accessible medium operable with a telecommunications node disposed in an access network as set forth in claim 9, wherein said predefined loopback path is effectuated by cross-connecting a transmit path and a receive path in a cross-connect module disposed on said network card.

15. A method for conducting diagnostic tests in a telecommunications node including an optics assembly coupled to a plurality of formatter cards, wherein a plurality of channel bank assemblies are coupled via a time slot interchanger (TSI) to said formatter cards, said method comprising the steps:

launching a diagnostics automaton at a predetermined time by an executive scheduler running on a standby formatter card, wherein said standby formatter card is in a provisioned configuration mode operable to transport communication traffic therethrough;

upon determining by said diagnostics automaton to install a diagnostic application, reconfiguring said standby formatter card into a loopback configuration mode involving a predefined loopback path in said telecommunications node and suspending said communication traffic through said standby formatter card, wherein said, predefined loopback path involves a first loopback path portion involving a transmit path and a receive path in said standby formatter card and a second loopback path portion involving said optics assembly, each of said first and second loopback path portions being effectuated via a decoupled cross-connect path in a cross-connect module disposed on said standby formatter card;

performing at least one diagnostic test relating to said predefined loopback path; and upon completing said at least one diagnostic test, reconfiguring said standby formatter card into said provisioned configuration mode in order to commence said communication traffic through said standby formatter card.

16. The method for conducting diagnostic tests in a telecommunications node as set forth in claim 15, wherein said communication traffic is commenced through said network card upon reconfiguration after a predetermined delay.

17. The method for conducting diagnostic tests in a telecommunications node as set forth in claim 16, wherein said predetermined delay is about 20 to 50 milliseconds.

18. The method for conducting diagnostic tests in a telecommunications node as set forth in claim 15, wherein said diagnostic application is installed once every second.

19. The method for conducting diagnostic tests in a telecommunications node as set forth in claim 15, wherein said step of performing at least one diagnostic test involves the step of injecting a predetermined pattern of test traffic at a particular point disposed on said predefined loopback path.

20. The method for conducting diagnostic tests in a telecommunications node as set forth in claim 15, further comprising the step of reporting an alarm to a terminal control processor disposed in said telecommunications node when a failure is detected with respect to said at least one diagnostic test.

* * * * *